(No Model.)

DE WITT C. LOCKWOOD.
FISHING ROD AND REEL.

No. 484,439. Patented Oct. 18, 1892.

WITNESSES:
C. M. Newman
A. J. Tanner

INVENTOR:
DeWitt C. Lockwood,
BY
J. H. Hubbard
his atty.

UNITED STATES PATENT OFFICE.

DE WITT C. LOCKWOOD, OF SHELTON, CONNECTICUT.

FISHING ROD AND REEL.

SPECIFICATION forming part of Letters Patent No. 484,439, dated October 18, 1892.

Application filed April 28, 1892. Serial No. 430,964. (No model.)

*To all whom it may concern:*

Be it known that I, DE WITT C. LOCKWOOD, a citizen of the United States, residing at Shelton, in the county of Fairfield and State of Connecticut, have invented certain new and useful Improvements in Fishing Rods and Reels; and I do hereby declare the following to be a full, clear, and exact description of the invention, such as will enable others skilled in the art to which it appertains to make and use the same.

This invention relates to certain novel and useful improvements in fishing rods and reels, but more particularly does it appertain to a new method of and means for the attachment of a reel upon the butt-joint of the rod; and the object of my invention is to provide a simple and efficient reel-support, so that the reel as nearly as possible may be axially aligned with the butt-joint; and, furthermore, to provide means whereby the reel may be quickly and easily changed from its position behind the hand to another and separate support which is in front of the hand, thereby making the rod adaptable either for fly-fishing or bait-fishing, at the option of the sportsman.

Heretofore, so far as I am aware, although reels have commonly been attached to the rod at the rear of the hand-grasp they have always been supported upon the side of the rod either by means of the common and well-known reel seat and plate or by a band and screw or the like. This puts the weight of the reel at one side of the rod and causes it, as a matter of course, to be heavier upon one side than upon the other. I find that by attaching the reel substantially in the line of the butt piece or joint and at the rear thereof not only is this unequal distribution of weight avoided, but the reel forms a counterbalance for the rod, which is peculiarly advantageous in fly-fishing. Furthermore, the turning of the rod from the casting position, which is preferably with the guide-loops and reel beneath it, to the reeling-in position, which is preferably with the guide-loops and reel on top, is not performed against the weight of the reel, as is now the case.

With the ends hereinbefore cited in view my invention consists in the construction and combination of elements hereinafter fully explained, and then recited in the claims.

In order that those skilled in the art to which my invention appertains may be able fully to understand the same, I will proceed to describe it in detail, reference being had to the accompanying drawings, which form a part of this specification, and in which—

Figure 1:
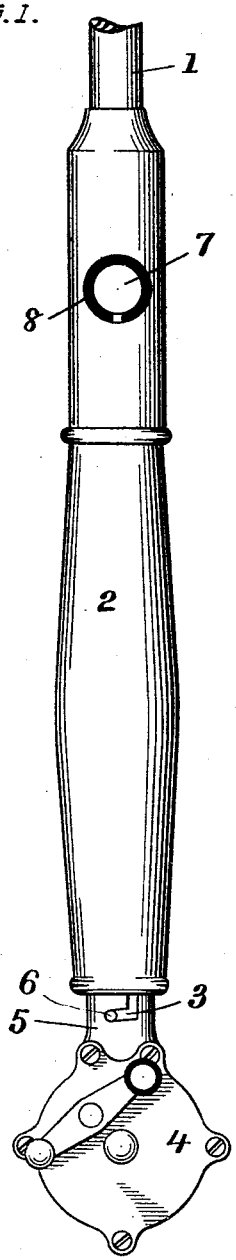
Figure 2:
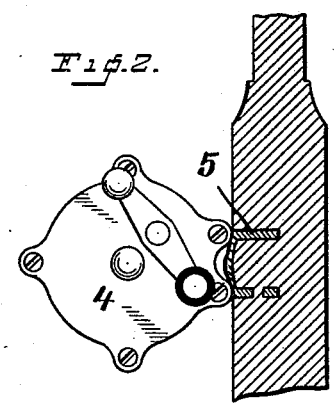
Figure 3:
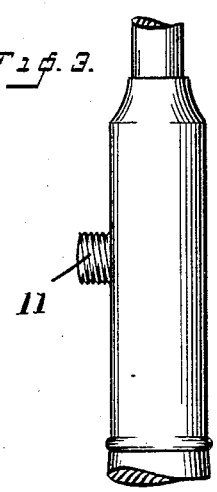

Figure 1 is an elevation of my invention; Fig. 2, a section showing the reel supported in its alternative position. Fig. 3 is a modification of the means for attaching the reel about the hand-grasp, and Fig. 4 a similar modification of the means for its attachment to the butt.

1 denotes the butt or lowermost joint of a fishing-rod, having thereon a hand-grasp 2. The lowermost end of the hand-grasp terminates in a cylindrical ferrule or plug 3.

4 is the reel, having attached thereto at the same place generally occupied by the reel-plate a tubular socket 5, preferably provided with a locking-slot adapted to co-operate with a pin 6 upon the ferrule. Above the hand-grasp is a seat for the reel, consisting of a plug or ferrule 7, surrounded by the groove 8, and upon this the reel is adapted to be seated, as is clearly shown at Fig. 2, so that without difficulty the reel may be supported upon the extreme end of the hand-grasp and in axial line therewith; or it may be attached above the hand-grasp, and it is readily interchangeable from one position to the other. For fly-fishing the rear attachment is preferable; but for bait-fishing and trolling the position above the hand-grasp is more desirable.

Figure 4:
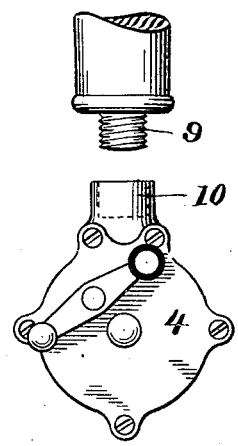

In Figs. 3 and 4 I show upon the butt of the rod the screw-threaded plug 9, and attached to the reel an interiorly-threaded socket adapted to co-operate therewith, and above the hand-grasp I show an externally-screw-threaded plug 11, with which the socket 10 may be engaged. This construction is shown merely as an alternative.

I claim—

1. The combination, with a reel having a socket or similar means of attachment, of the rod having upon its extremity a seat for the reel-socket, whereby the reel is supported in axial line with the rod, substantially as described.

2. The combination, with a rod having two reel-supporting plugs, one in line with its axis and the other at right angles thereto, of a reel provided with a socket and adapted to be supported upon either of the plugs, substantially as set forth.

3. The rod provided with plugs 3 and 7 at right angles to each other, the one upon the end of the rod and the other above the hand-grasp, in combination with a reel having a socket adapted to said plugs.

In testimony whereof I affix my signature in presence of two witnesses.

DE WITT C. LOCKWOOD.

Witnesses:
J. TOMLINSON,
L. V. B. HUBBARD.